(12) United States Patent
Kubo et al.

(10) Patent No.: US 6,395,814 B1
(45) Date of Patent: May 28, 2002

(54) WIPER BLADE UTILIZING PIEZOELECTRICITY OF TOURMALINE AND METHOD FOR MANUFACTURE OF THE SAME

(75) Inventors: Tetujiro Kubo, Tokyo; Takao Watanabe, Saitama-ken, both of (JP)

(73) Assignee: Maruenu Kabushikikaisha, Saitama-ken (JP)

( * ) Notice: Subject to any disclaimer, the term of this patent is extended or adjusted under 35 U.S.C. 154(b) by 0 days.

(21) Appl. No.: 09/533,113

(22) Filed: Mar. 22, 2000

(30) Foreign Application Priority Data

Jul. 30, 1999 (JP) ............................. 11-249110

(51) Int. Cl.⁷ ................................. C08K 3/18

(52) U.S. Cl. ...................................... 524/443

(58) Field of Search ......................... 524/443

(56) References Cited

U.S. PATENT DOCUMENTS 5,153,657 A * 10/1992 Yu .............................. 355/299

* cited by examiner

*Primary Examiner*—Paul R. Michl
(74) *Attorney, Agent, or Firm*—Wenderoth, Lind & Ponack, L.L.P.

(57) ABSTRACT

This invention is to provide a wiper blade for removal of oil film which utilizes piezoelectricity of tourmaline, and an elastic material 1 for primary material of the wiper blade B is masticated, and the tourmaline T whose particle diameter is 0.1 micron to 30 microns, preferably 0.1 micron to 3 microns is blended with the masticated elastic material 1 for primary material of the wiper blade B by means of the roller, and thereafter the tourmaline T is blended together with the cross linking agent 2 and another blending agent 3 in the elastic material 1 for primary material which is kneaded, and finally, the end product is molded (heating and pressurization), and in 100 parts of the elastic raw material, 0.2 to 100 parts of the electric stone (tourmaline) T is contained and the resulting wiper blade of this invention has an effect of removing the oil film.

14 Claims, 4 Drawing Sheets

WIPER BLADE UTILIZING PIEZOELECTRICITY OFTOURMALINE AND METHOD FOR MANUFACTURE OF THE SAME

BACKGROUND OF THE INVENTION

Heretofore, a blade of a wiper for removing waterdrop of a window of a motor car and the like has been manufactured by molding a mixture consisting of rubber and the like as a principal ingredient and a cross linking agent and other additives. Normally, in the additives mentioned above, tourmaline was not contained. Of course inventor of the present invention of the application became aware of the application of the tourmaline, and filed a patent application (Japanese Patent Application No. Hei 2-325294). In case the tourmaline is not used, oil film is formed on the window, and particularly in the night time, light reflects with the film which brings out a danger due to the deteriorated field of vision. Under the circumstance, a variety of medical fluids have been used for removal of the oil film. However, those medical fluids must be used whenever the window wiper is used which is not only a cumbersome greatly to the driver but also produces environment problems owing to the fact that the fluids are chemical fluids. Even though a quantity of the fluid to be used by one driver at a time is small, such problems cannot be avoided if a majority of cars use. When the tourmaline is used, the inventor of the present invention of the application was not aware of the piezoelectricity and was aware of only the permanent electrode of the tourmaline so that the effect was not fully analyzed by the inventor.

SUMMARY OF THE INVENTION

The wiper blade utilizing piezoelectricity of tourmaline and a method of manufacturing the wiper blade according to the present invention was conceived by the inventor in order to solve the problems. A masticated material for primary material of wiper blade such as rubber (polymer) is blended with the tourmaline and a cross linking agent to be kneaded to produce the wiper blade.

Figure 1:
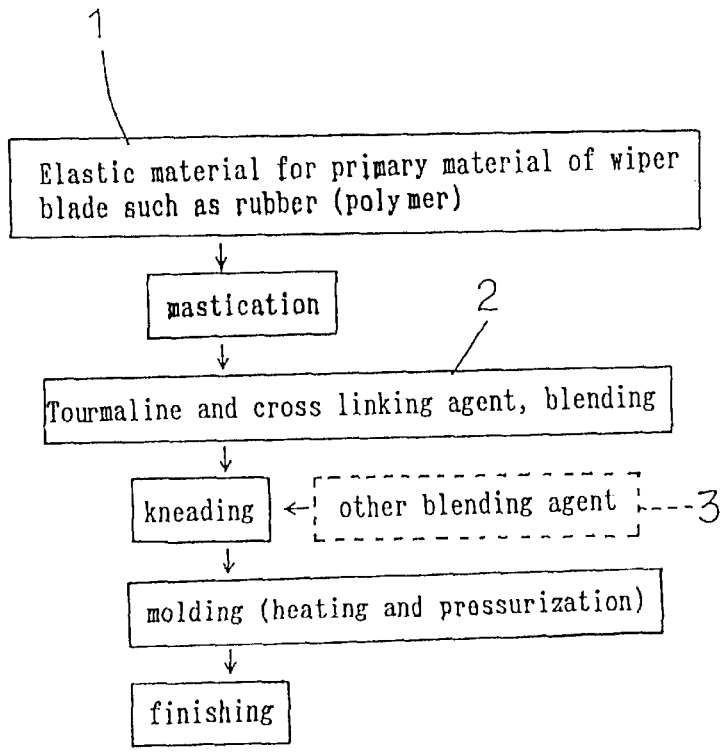
FIG. 1 denotes a block diagram showing a process of an embodiment of a manufacturing method of a wiper blade utilizing piezoelectricity of the tourmaline according to the present invention.

The reference numerals and letters in FIGS. 2–8 have the following meanings:

1. elastic material
2. cross linking agent
B. wiper blade
H. holder
R. rubber
T. tourmaline
W. window

DETAILED DESCRIPTION OF THE INVENTION

The present invention broadly relates to wipers, and particularly, to wipers used for windows of automobiles and the like. Especially, the present invention relates to wipers using tourmaline.

A concrete construction of a wiper blade whose tourmaline takes an advantage of piezoelectricity and a method of manufacturing the same according to the present invention is described in details in the following. Initially, the construction of the wiper blade utilizing piezoelectricity of the tourmaline of the present invention set forth in the claim 1 of the present invention will be described. In the first place, the present invention comprises masticated elastic material for primary material of a wiper blade such as rubber (polymer). In the elastic material for primary material of the wiper blade, the tourmaline whose particle diameter is 0.1 micron to 30 microns, and preferably 0.1 micron to 5 microns and a cross linking agent are blended and kneaded. Furthermore, the elastic material for primary material of the wiper blade which is prepared by kneading the tourmaline and the cross linking agent is molded (heating and pressurization), and whereas 0.2 to 100 parts or 1 to 30 parts of the tourmaline is blended with 100 parts of the elastic raw material.

The construction of the wiper blade utilizing piezoelectricity of tourmaline and the method of manufacturing the same according to the claim 2 of the present invention will be described. Firstly, the elastic material for primary material of the wiper blade such as rubber (polymer) is masticated. Thereafter, the tourmaline whose particle diameter is 0.1 micron to 30 microns, preferably 0.1 micron to 5 microns is kneaded with the masticated elastic material. 0.2 to 100 parts or preferably 1 to 30 parts of the tourmaline is kneaded with 100 parts of the elastic raw material. Thereafter, the cross linking agent is kneaded with the kneaded material. Lastly the resultant kneaded material is molded (heating and pressurization).

Finally, the construction of the wiper blade utilizing piezoelectricity of tourmaline and the method of manufacturing the same according to the claim 3 of the present invention will be described. Firstly, the elastic material of wiper blade such as rubber (polymer) and the like is masticated. Thereafter, a cross linking agent is kneaded with the masticated elastic material for primary material of wiper blade. Thereafter, the tourmaline whose particle diameter is 0.1 micron to 30 microns, preferably 0.1 micron to 5 microns is kneaded. 0.2 to 100 parts or preferably 1 to 30 parts of the tourmaline is kneaded with the elastic raw material. Finally, the resultant kneaded material is molded (heating and pressurization).

THE EMBODIMENT OF THE PRESENT INVENTION

The general embodiment of the wiper blade utilizing piezoelectricity of the tourmaline and the method of manufacturing the same according to the present invention will be described below. It resides in the wiper blade and the method of manufacturing the same prepared by blending a variety of additives according to necessities, 0.2 to 100 parts of the finely pulverized tourmaline with 100 parts of the elastic raw material of wiper blade which is a simple substance such as natural rubber, synthetic rubber, synthetic resin and the like or their mixtures, and molding the resultant kneaded material.

The detailed description of the wiper blade utilizing piezoelectricity of the tourmaline and the method of manufacturing the same according to the present invention is provided together with the attached drawings by using its concrete embodiment. In the first place, the masticated elastic material is provided for primary material of the wiper blade B such as rubber (polymer) and the like. The elastic material for the primary material of the wiper blade B is viscid material consisting of a simple substance such as natural rubber, synthetic rubber, synthetic resin and the like or their mixtures. The elastic material for primary material of the wiper blade B is the product prepared by blending and kneading the elastic material with the tourmaline T and the additive 2 and another blending agent 3. Whereas, the particle diameter of the tourmaline is 0.1 micron to 30 microns, preferably 0.1 to 5 microns. Furthermore, in the elastic material 1 for primary material of the wiper blade B, the tourmaline T and the cross linking agent are kneaded and the resultant material is molded (heating and pressurization).

On the other hand, as an example of the blending ratio of the blending agent, natural rubber is 100 parts, zinc flower 4 parts, stearic acid 2 parts, and carbon black 70 parts, tourmaline 10 parts, process oil 5 parts, sulfur 2.5 parts, antioxidant 2 parts, ozone crack preventing agent 2 parts, vulcanization-accelerator 0.7 part, and as the vulcanizing condition, 165° C.×6 min.

Figure 2:
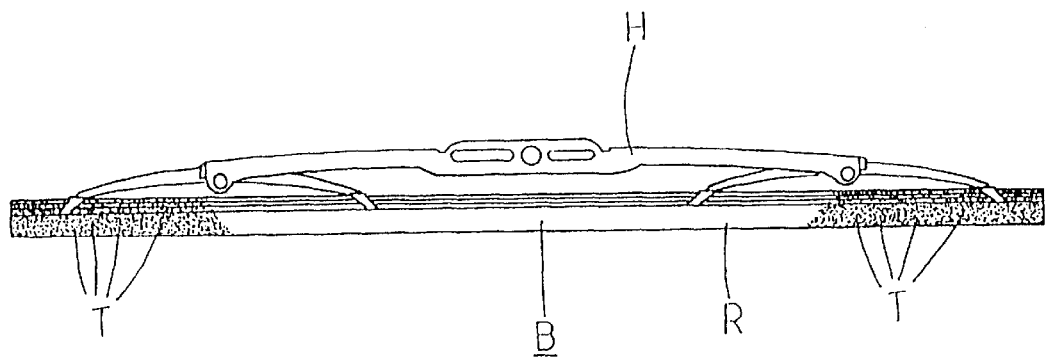
FIG. 2 denotes a plan of an embodiment of the wiper that uses a wiper blade utilizing piezoelectricity of the tourmaline according to the present invention.
Figure 3:
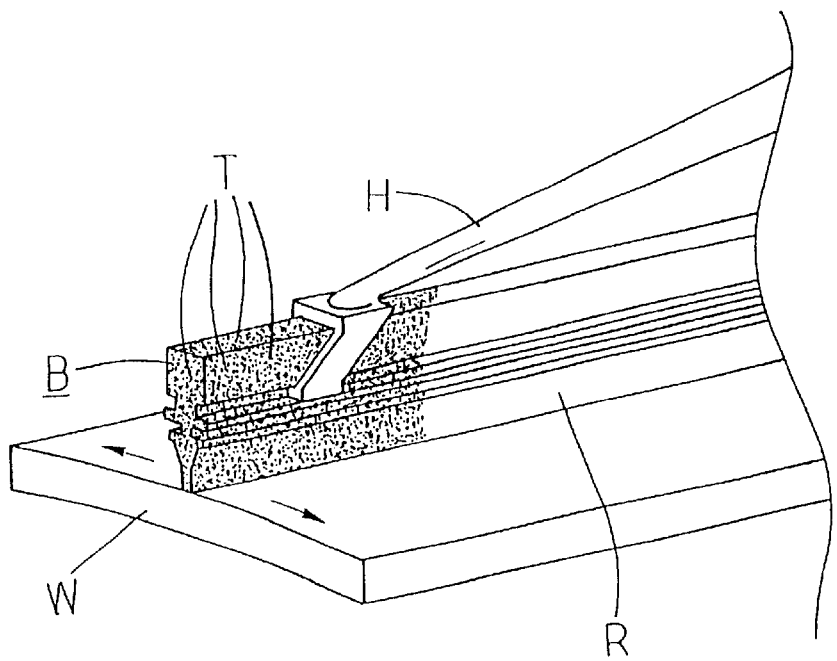
FIG. 3 denotes a partly enlarged perspective drawing of the embodiment shown in FIG. 2.
Figure 4:
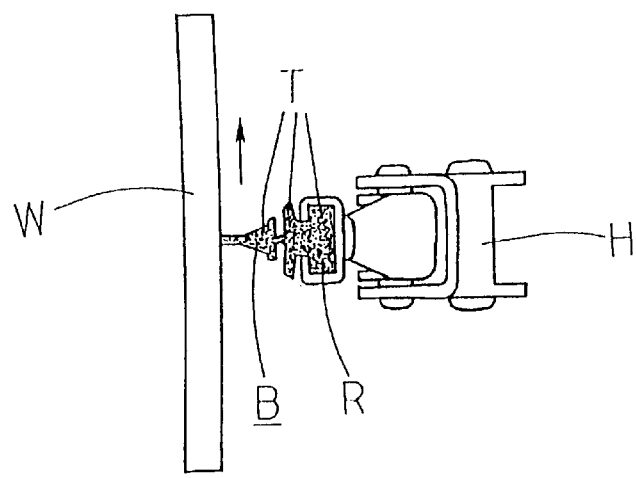
FIG. 4 denotes an enlarged left side drawing of the embodiment shown in FIG. 2.
Figure 5:
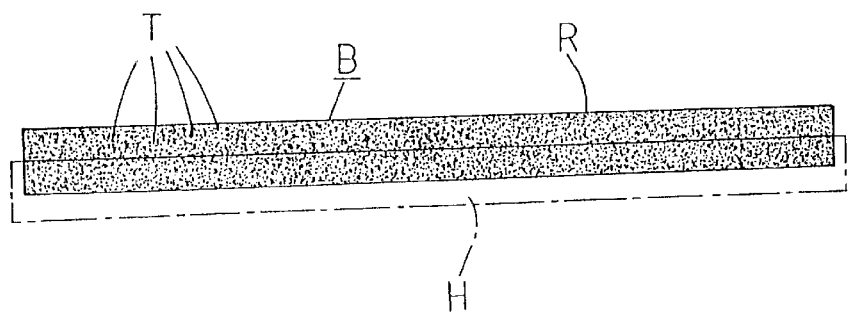
FIG. 5 denotes a plan of an embodiment of a wiper blade utilizing piezoelectricity of the tourmaline according to the present invention.
Figure 6:
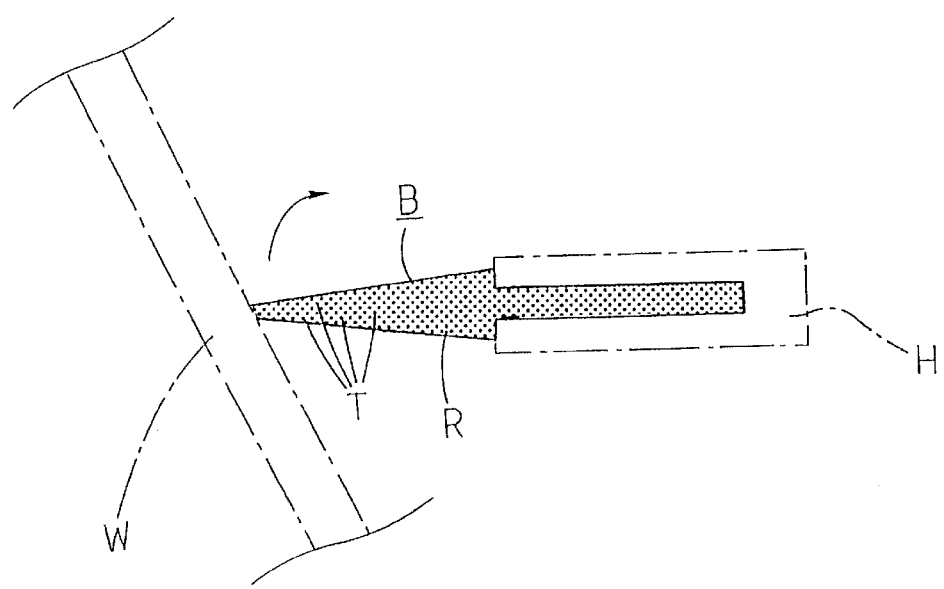
FIG. 6 denotes an enlarged left side drawing of the embodiment shown in FIG. 5.
Figure 7:
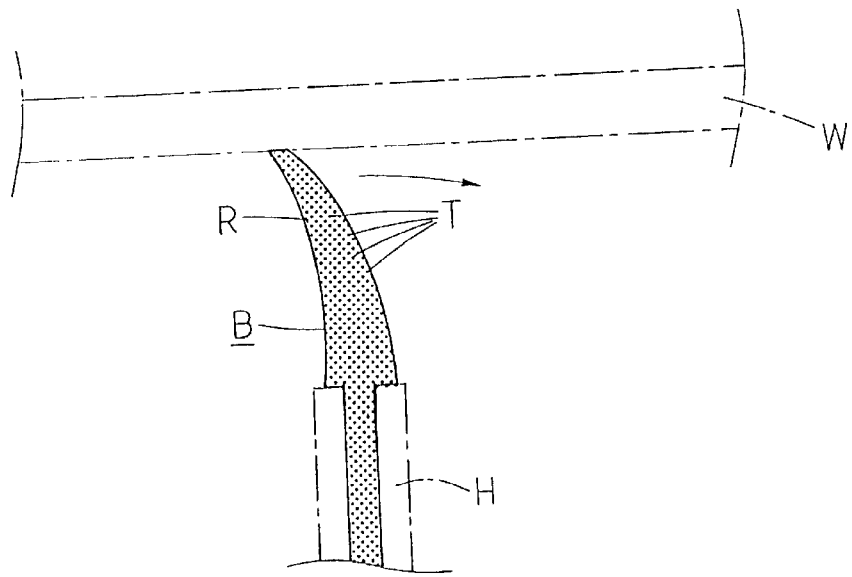
FIG. 7 denotes a plan whose part is abridged when the embodiment shown in FIG. 5 is at an upright position upon its turning to the right.
Figure 8:
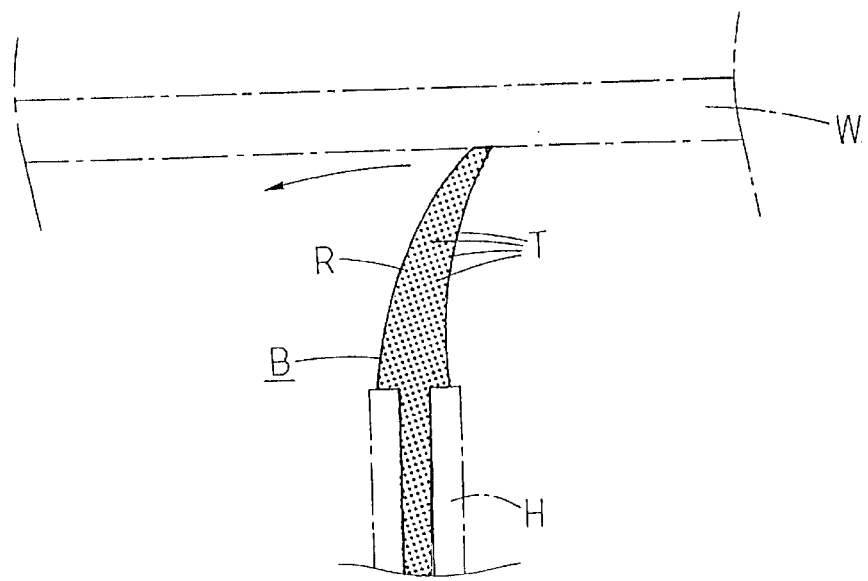
FIG. 8 denotes a plan whose part is abridged when the embodiment shown in FIG. 5 is at an upright position upon its turning to the left from its shuttle swing point.

The concrete method of manufacturing the wiper blade B is described hereinafter, as shown in FIG. 1 wherein the elastic material 1 for primary material of the wiper blade B such as rubber (polymer) and the like is masticated. Thereafter, the masticated elastic material 1 for primary material of the wiper blade is kneaded with the tourmaline T whose particle diameter is 0.1 micron to 30 microns, preferably 1 to 3 microns by means of the roller. The cross linking agent 2 and the another blending agent 3 are kneaded with the elastic material 1 for primary material in which the tourmaline T is kneaded. The mixing and kneading order of the cross linking agent 2 and the tourmaline T may be reversed. Finally, the resultant kneaded material is subjected to the molding (heating and pressurization). The window wiper shown in FIG. 2 to FIG. 3 is completed by holding the molded product with the holder H.

As described in the foregoing, a manufacturing method for producing the wiper blade B comprises blending the electric stone (tourmaline) which is finely pulverized with the elastic raw material 1 for wiper blade consisting of a simple substance such as the natural rubber, synthetic rubber, synthetic resin and the like at a blending ratio of 0.2 to 100 parts with 100 parts of the elastic raw material and if necessary, blending a variety of additives and molding it.

Although it is feasible to use the quantity of the electric stone (tourmaline) at an adding amount at a ratio of 0.2 to 100 parts to be blended with 100 parts of the elastic raw material, preferably 1 to 30 parts. With the adding amount of less than 0.2 part, satisfactory oil film removal effect cannot be obtained, and also, if the adding amount is more than 100 parts, the film is hardened which spoils the performance of the wiper blade.

The particle diameter of the electric stone is chosen as an optimum particle diameter depending on the elastic raw material. Normally, the particle diameter is less than 30 microns. As the other additives, the sulfur is noted, but as general plasticizers such as magnesium carbonate, calcium carbonate, carbon black, clay and the like or antioxidant ozone crack preventing agent and the like can be enumerated, and these materials may be blended if necessary to be molded. This carbon black is used for the coloring and mechanical reinforcement.

As the rubber is an electrical insulator, the electricity from the permanent electrode of the tourmaline does not flow outside as it is even if finely pulverized powder of the electrical conductive material is mixed with the rubber. However, in case of using the material in the wiper blade, as per an explanation drawing illustrated in FIG. 5 to FIG. 8, particularly, FIG. 7 to FIG. 8, the blade B is bent in the right and left directions by the swing of the wiper. The piezoelectricity is generated by the pressure applied at the time which raises the voltage. The increased voltage helps work the action of the tourmaline on the wiper blade, and it works to remove the oil film on the window. Besides the piezoelectricity effect, pyroelectricity effect also works by the heat generation caused by the blending.

A great many effects have been produced as was described hereinbefore by solving the foregoing problems with the employment of the wiper blade utilizing piezoelectricity of the tourmaline and a method of manufacturing the same according to the present invention. Namely, the electric stone pulverized in fine particles is blended at a blending ratio of 0.2 part to 100 parts of the elastic raw material consisting of simple substance such as natural rubber, synthetic rubber, synthetic resin and the like or a mixture thereof, and furthermore, if necessary, a variety of additives are blended to be subjected to the molding to produce the wiper blade so that the wiper blade according to the present invention has succeeded in providing the oil film removing effect.

What is claimed is:

1. A vehicular windshield wiper blade, comprising:
   a mixture of tourmaline whose particle diameter is 0.1 microns to 30 microns, a cross linking agent and an elastic raw material,
   wherein 0.2 to 100 parts of the tourmaline is blended to 100 parts of the elastic raw material,
   wherein the mixture is formed in the shape of a vehicular windshield wiper blade having a longitudinal pointed edge for contacting the surface of a vehicular windshield, and
   wherein the wiper Wade removes an oily film on the surface of the vehicular windshield using a piezoelectric property of the tourmaline.

2. The wiper blade of claim 1, wherein the particle diameter of tourmaline is 0.15 micron to 5 microns.

3. The wiper blade of claim 1, wherein the elastic raw material is rubber.

4. The wiper blade of claim 1, wherein 1 to 30 parts of tourmaline is blended to 100 parts of the elastic raw material.

5. A method of manufacturing a vehicular windshield wiper blade, which comprises kneading tourmaline whose particle diameter is 0.1 micron to 30 microns with an elastic raw material, blending a cross linking agent with the kneaded material, and molding the resultant kneaded material, wherein 0.2 to 100 parts of the tourmaline is blended to 100 parts of the elastic raw material, wherein the resultant kneaded material is molded in the shape of a vehicular windshield wiper blade having a longitudinal pointed edge for contacting the surface of a vehicular windshield, and wherein the wiper blade removes an oily film on the surface of the vehicular windshield using a piezoelectric property of the tourmaline.

6. The method claim 5, wherein the particle diameter of tourmaline is 0.15 micron to 5 microns.

7. The method of claim 5, wherein the elastic raw material is rubber.

8. The method of claim 5, wherein 1 to 30 parts of tourmaline is blended to 100 parts of the elastic raw material.

9. The method of claim 5, wherein the molding step is conducted under heat and pressure.

10. A method of manufacturing a vehicular windshield wiper blade, which comprises kneading a cross linking agent with an elastic raw material, kneading tourmaline whose particle diameter is 0.1 micron to 30 microns with the kneaded material, and molding the resultant kneaded material, wherein 0.2 to 100 parts of tourmaline is blended to 100 parts of the elastic raw material, wherein the resultant kneaded material is molded in the shape of a vehicular windshield wiper blade having a longitudinal pointed edge for contacting the surface of a vehicular windshield, and wherein the wiper blade removes an oily film on the surface of the vehicular windshield using a piezoelectric property of the tourmaline.

11. The method of claim 10, wherein the particle diameter of tourmaline is 0.15 micron to 5 microns.

12. The method of claim 10, wherein the elastic raw material is rubber.

13. The method of claim 10, wherein 1 to 30 parts of tourmaline is blended to 100 parts of the elastic raw material.

14. The method of claim 10, wherein the molding step is conducted under heat and pressure.

* * * * *